Nov. 1, 1949.    G. W. STODDARD    2,486,577
PNEUMATIC HAY STACKER
Filed Sept. 19, 1947    2 Sheets-Sheet 1
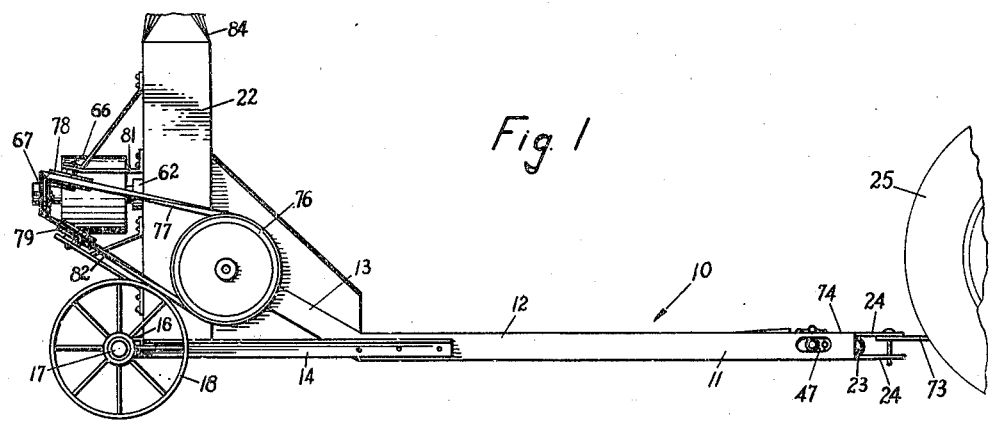
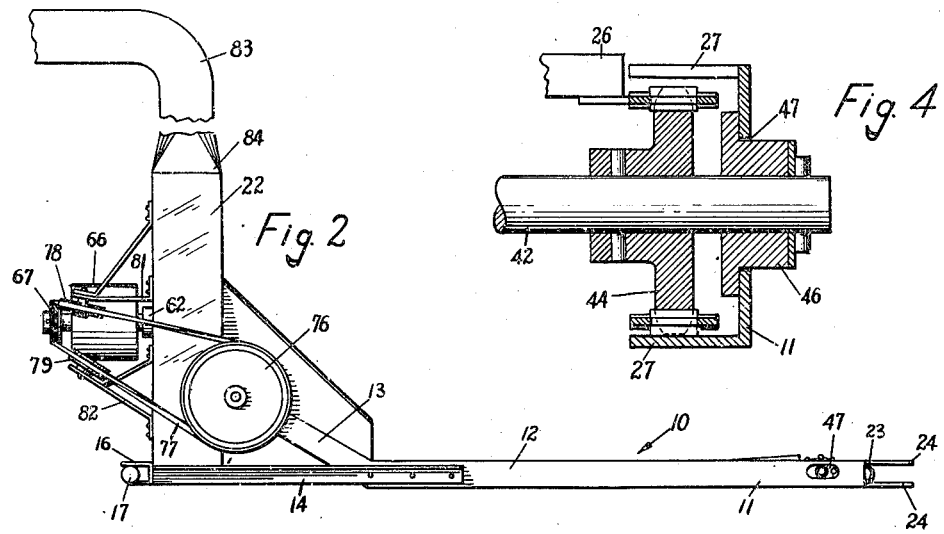
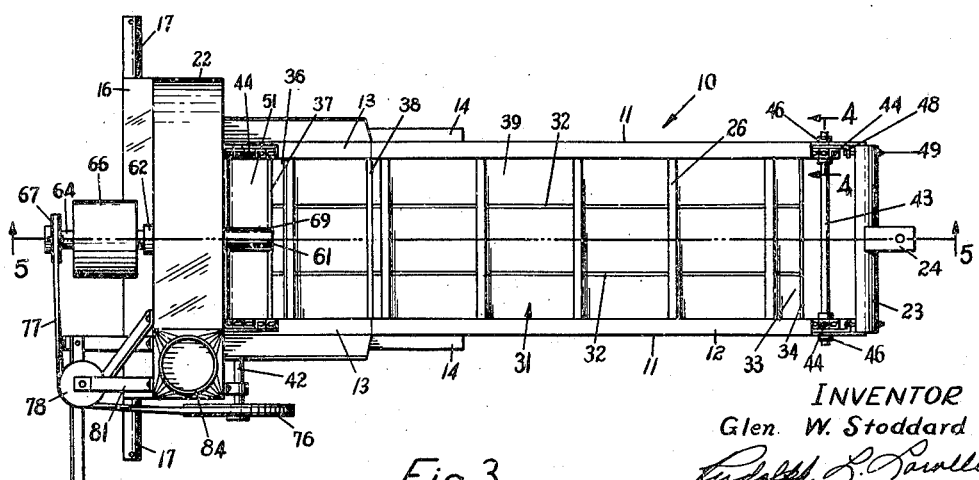
INVENTOR
Glen W. Stoddard Nov. 1, 1949.  G. W. STODDARD  2,486,577
PNEUMATIC HAY STACKER
Filed Sept. 19, 1947  2 Sheets-Sheet 2
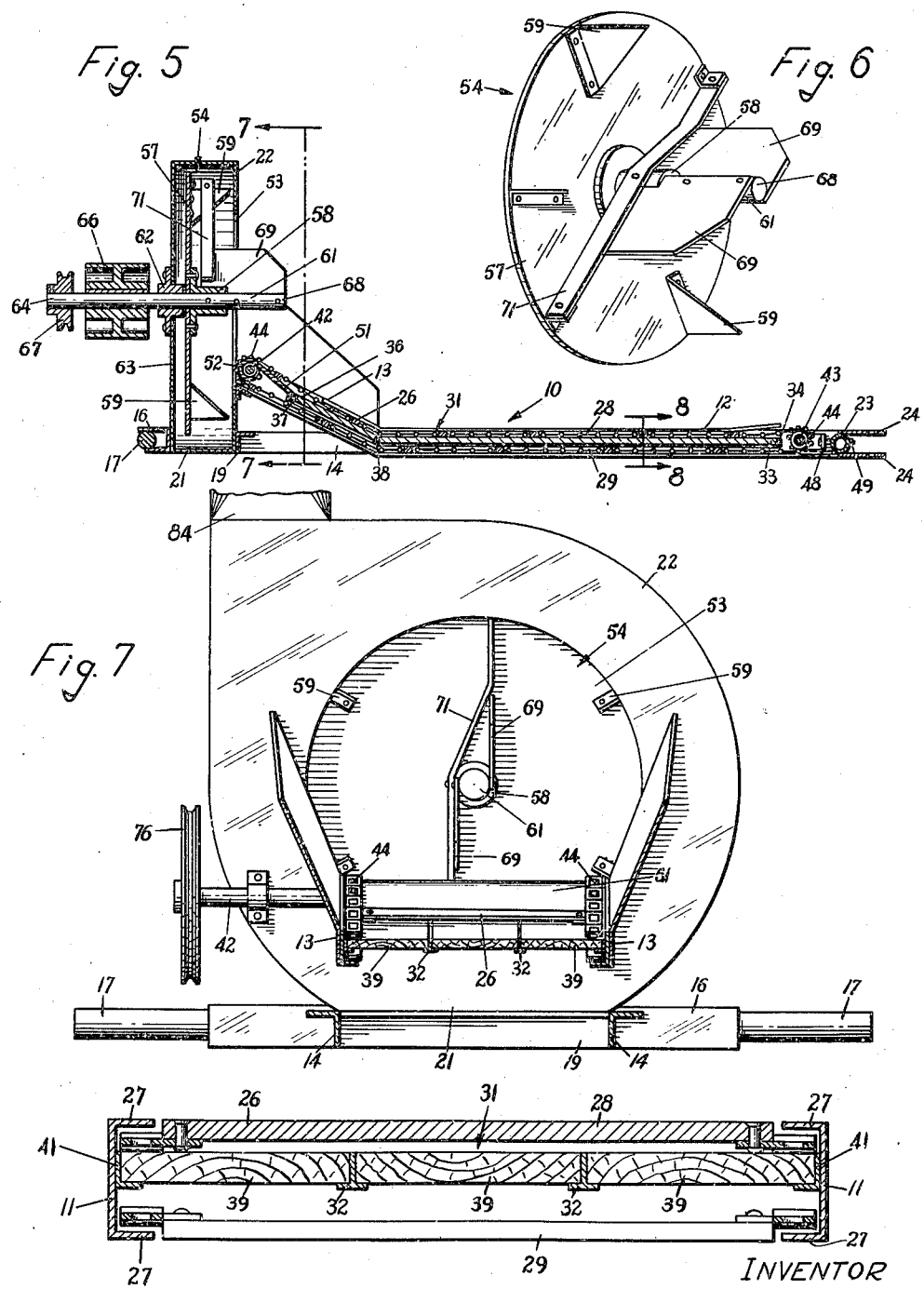
INVENTOR
Glen W. Stoddard
By Rudolph L. Lowell
atty.

Patented Nov. 1, 1949

2,486,577

UNITED STATES PATENT OFFICE 2,486,577

PNEUMATIC HAY STACKER

Glen W. Stoddard, Grant Township, Tama County, Iowa

Application September 19, 1947, Serial No. 775,001

10 Claims. (Cl. 214—83.28)

This invention relates generally to stacking machines and in particular to a portable machine for pneumatically stacking chopped hay.

The chopping or cutting of hay prior to storing the hay in a haymow or the like is becoming a rather general practice, particularly for large stock raisers, due to the fact that more chopped hay by weight can be stored in a given space as contrasted to hay harvested in the usual manner and left long.

A further advantage of chopped hay is found in the fact that in feeding the hay by a pitch fork or like means, little effort is needed to separate that portion of the hay to be fed from the main body of hay. Also, cattle in feeding have a habit of swinging their heads from side to side. In feeding on long hay this habit results in an appreciable portion of the hay being thrown under the cattle. Since cattle generally do not feed on hay so disposed, this hay is usually lost for feeding purposes.

A practice usually followed in preparing chopped hay is to first cut and dispose the hay in windrows in the field. The windrowed hay is then cut or chopped concurrently with its being loaded on to a hay rack or the like. The rack, on being transported to a mow is manually unloaded, which operation necessitates much time and effort, especially in large haymows.

It is an object of this invention, therefore, to provide an improved machine for pneumatically delivering chopped hay into a haymow.

A further object of this invention is to provide a portable pneumatic hay stacking machine equipped with a horizontal conveyor and a hay blower structure relatively constructed and arranged such that a hay wagon can be driven along side of the conveyor, or positioned over the conveyor for dumping the hay on the conveyor for delivery to the blower.

Another object of this invention is to provide a portable pneumatic hay blower capable of being tractor drawn, and on disconnection from the tractor, of being supported firmly on the ground surface for operation by the tractor.

An important object of this invention is to provide a hay blower for chopped hay in which the hay is fed to the blower at a rate commensurate with the capacity of the blower to handle the hay so as to prevent any overloading or stalling of the blower.

A feature of this invention is found in the provision of a portable pneumatic hay stacker in which an elongated main frame is constructed such that in an operating position its bottom side rests directly on the ground surface. A conveyor means extended lengthwise of the frame has a horizontal portion and an inclined portion the upper end of which terminates at the inlet of a casing for a rotatable fan or blower. The horizontal portion of the conveyor, and the frame section on which it travels, are relatively constructed and assembled so that the horizontal conveyor portion is within the vertical confines of such frame section and the height of the frame section is relatively low so that a vehicle can be readily driven thereover. As a result a vehicle with a drop bottom can be positioned over the conveyor, or to one side thereof, for dumping purposes.

Another feature of this invention is found in the provision of a pneumatic hay stacker in which a blower is comprised of a disc member equipped with spaced vanes laterally extended from one of its sides. The blower shaft projects outwardly from such one side of the blower and through an inlet in a casing for the blower. Mounted on the projected shaft end is a blade unit of a substantially rectangular shape, extended transversely in opposite directions from the shaft. The blade or paddle, which may be appropriately defined as a "dasher" since it serves to separate or break up the hay into individual sections as it enters the blower casing and to regulate the rate of delivery of hay to the blower, so that the hay is fed into the blower at a rate commensurate with the capacity of the blower to effectively blow the hay to its storage position.

Further objects, features and advantages of this invention will become apparent from the following description when taken in connection with the accompanying drawings, in which:

Fig. 1 is a side elevation of the portable pneumatic hay stacker of this invention shown in transport position;

Fig. 2 is a side elevation of the stacker illustrated similarly to Fig. 1 and showing it in operating position;

Fig. 3 is a top plan view of the stacker shown in Fig. 2;

Fig. 4 is an enlarged sectional detail view taken on the line 4—4 in Fig. 3;

Fig. 5 is a longitudinal sectional view as seen along the line 5—5 in Fig. 3;

Fig. 6 is a detail perspective view of a hay blower assembly forming part of the invention; and Figs. 7 and 8 are enlarged transverse sectional views taken along the lines 7—7 and 8—8, respectively, in Fig. 5.

With reference to the drawings, the pneumatic stacker of this invention is illustrated in Figs. 2 and 3 as including an elongated portable frame, designated generally as 10, and including a pair of transversely spaced longitudinal frame members 11 of a channel construction and faced inwardly toward each other. The frame members 11 have horizontal sections 12 and upwardly and outwardly inclined sections 13. The inner ends of the horizontal sections 12 are provided with angle iron extensions 14 arranged in a transversely spaced relation and terminating at a position outwardly from the upper or outer ends of the inclined sections 13.

The free or outer ends of the extensions are connected together by a transversely extended channel shaped member 16, which is faced outwardly and has a transverse shaft 17 rigidly secured between its legs, as by welding or like means. As best appears in Figs. 3 and 7, the opposite ends of the shaft 17 project laterally from opposite sides of the frame 10 for the purpose of carrying ground wheels 18, as shown in Fig. 1.

Spaced inwardly from the transverse member 16 and connected between the extensions 14, is a transverse angle member 19 (Fig. 5). It is thus seen that an open rectangularly shaped space is defined by the transverse members 16 and 19, and those portions of the extensions 14 lying between such transverse members. Arranged within such space in a supported position on the transverse members 16 and 19, and on the extensions 14, is the lower end 21 of an upright blower casing 22 which extends transversely of the frame 10. The casing 22 is secured to the frame 10 by any suitable means such as welding.

The outer ends of the frame sections 12 are connected together by a pipe member 23 (Figs. 2, 3 and 5). Projected outwardly from opposite sides of the pipe member 23 are a pair of vertically spaced plate members 24 which constitute part of a hitch attachment for a tractor, indicated generally as 25 in Fig. 1.

Extended lengthwise of the frame 10 is a hay conveyor 26 (Figs. 3, 5 and 8) of a usual chain and slat type, which is supported for movement between the legs 27 of the frame members 11. The upper and lower lengths 28 and 29, respectively, of the conveyor 26 are separated by a floor, indicated generally as 31, comprised of longitudinal transversely spaced inverted T-members 32 substantially coextensive in length with the frame members 11 and arranged in a plane intermediate the legs 27.

The inverted T-members 32 are connected at their ends 33 (Figs. 3 and 5) to a transverse member 34 which is connected between the frame members 11 at a position spaced inwardly from the transverse pipe 23. The ends 36 of the inverted T-members are connected to a transverse member 37 which is spaced inwardly from the upper ends of the inclined frame member sections 13. Intermediate their ends 33 and 36, and at the junction of the horizontal sections 12 and inclined sections 13, the inverted T-members are further supported on a bar 38 which is connected between the frame members 11. Planks 39 (Fig. 8) are carried on the T-members 32 and on angle members 41 secured to the inner sides of the frame members 11.

A first sprocket shaft 42 (Figs. 3 and 5) is mounted between the upper ends of the inclined sections 13 and a second sprocket shaft 43 between the outer ends of the horizontal sections 12 at a position between the transverse member 34 and the pipe member 23. The conveyor 26 travels about sprockets 44 carried on the shafts 42 and 43 and has its upper length 28 guidably supported for longitudinal movement between the upper legs 27 of the frame members 11, and the top side of the floor 31, and its lower length 29 guidably supported for longitudinal movement between the lower legs 27, of the frame members 11, and the underside of the floor 31. It is seen, therefore, that the conveyor 26 is located entirely within the vertical confines of the frame members 11 for a purpose which will appear later.

The shaft 43 (Figs. 3 and 4) is carried in bearings 46 which are slidably mounted in longitudinal slots 47 in the frame members 11, for movement longitudinally of such frame members. The bearings 46 are provided with brackets 48 which are connected with bolts 49 extended transversely through the pipe member 23. On adjustment of the bolts 49 the shaft 43 is moved longitudinally of the frame members 11 so as to adjust the tension in the conveyor 26.

The floor 31, at the delivery end of the conveyor 26, (Figs. 5 and 7) carries a sheet metal extension 51 the outer end 52 of which is curved downwardly about the shaft 42 between the sprockets 44 on such shaft. The shaft 42 is located substantially at the inlet 53 for the blower casing 22, so that hay carried on the conveyor 26 is delivered directly into the inlet 53.

Rotatably supported within the casing 22 is a blower or fan 54 (Figs. 5, 6 and 7) which includes a flat disc member 57 having a hub 58. Vanes or impellers 59, of a triangular shape, project laterally from one side of the disc 57 and are arranged in a spaced relation about the disc.

The blower hub 58 is mounted on a shaft 61 which is rotatably supported in a bearing 62 carried in the outer side 63 of the casing 22. The shaft end 64 projects outwardly from the casing side or back wall 63 and has mounted thereon a flat belt pulley 66 and a V-belt pulley 67. The shaft end 68 projects outwardly through the casing inlet 53 and over the delivery or upper end of the conveyor 26.

Mounted on the shaft end 68 is a blade unit comprised of a pair of blades 69, of a flat substantially rectangular shape, which extend radially outwardly in opposite directions from the shaft 61. As best appears in Figs. 5 and 6, the blades 69 are of a length substantially coextensive in length with the projected shaft end 68. In other words, the blades 69 extend from the inner end of the shaft 61 to substantially the disc member 57 of the blower 54.

The inner adjacent sides of the blades 69 are welded to the shaft 61, while their inner ends are welded to a brace member 71 extended across and secured at 72 to the blower disc 57. From a consideration of Fig. 7, it is seen that the rotary path of movement covered by the blades 69, covers an appreciable portion of the area of the blower inlet 53.

In the use of the stacker of this invention, for transport purposes, the hitch attachment 24 is connected in a usual manner to the drawbar 73 of the tractor 25, and the ground wheels 18 are mounted on the shaft 17. For operating purposes, and after the stacker has been transported to a desired position, the tractor 25 is disconnected from the frame 10 so that the frame end 74 (Fig. 1) rests on the ground surface. The tractor is then utilized, by its connection with a suitable portion of the blower casing 22, to laterally tip the frame 10 in opposite directions to provide for the removal of the ground wheels 18. Thus on disconnection of the hitch 24 from the tractor 25, and the removal of the ground wheels 18, the bottom side of the frame 11 rests directly on the ground surface, as shown in Fig. 2. By utilizing the tractor for tipping purposes the stacker is capable of being easily set up for operation by one man.

The pulley 66 is then belt connected with the usual belt pulley on the tractor 25. The pulley 67 constitutes a drive pulley for the conveyor 26, which has a driven pulley 76 mounted on the sprocket shaft 42 at a position to one side of the casing 22 (Figs. 2 and 3). A single belt 77 is then passed about the pulleys 67 and 76, and a pair of vertically spaced pulleys 78 and 79, which are mounted on brackets 81 and 82, respectively, attached to the outer or back side 63 of the blower casing 22. A blower pipe 83 is then connected to the casing outlet 84 which is arranged at the top side of the casing 22.

With blower 54 in operation chopped hay to be stacked is thrown on to the top length 28 of the conveyor 26 for delivery to the casing inlet 53. As the hay enters the inlet 53, it is acted upon by the blades 69 which operate to separate the hay so as to eliminate bunches of hay being fed into the casing 22. The separated hay is then drawn into the inlet 53 by the blower 54 for discharge from the casing outlet 84 into the pipe 83. Further, because of the rotational movement of the blades 69 within the inlet 53, the blades act to control the feeding of the hay from the conveyor 26 into the inlet 53.

Stated otherwise, when a large load or bunch of chopped hay reaches the inlet 53, its movement into the inlet 53 is slowed down by the rotating action of the blades 69. As a result the hay merely rides the conveyor 26 and is gradually broken up and separated by the blades 69 for feeding to the blower 56. As a result of this retarding action on the hay by the rotary action of the blades 69, the blades perform the dual purpose of separating the hay to facilitate its being acted upon and discharged by the blower 56, and controlling the delivery of the hay into the casing 22 at a rate commensurate with the capacity of the blower 56, so as to eliminate any overloading or stalling of the blower.

In practice the stacker is generally positioned to the outside of a barn, and the pipe 83 is extended upwardly into the haymow and then provided at its discharge end with a swingable portion (not shown) so as to reach all portions of the haymow. Thus by merely changing the position of the discharge end of the pipe 83, the chopped hay can be directed into any part of the haymow.

To facilitate the dumping of hay on to the conveyor 26, it is contemplated that the frame members 11 be of a vertical height on the order of about three and one-half inches. Since the conveyor 26 is within the vertical confines of the frame members 11, a hay wagon with a drop floor can be driven over the horizontal sections 12 of the frame members 11 so that the hay can be dumped directly through the bottom of the wagon on to the conveyor. Where hay wagons of a usual type only are available, they can be driven to either side of the conveyor, or backed up to the conveyor for unloading purposes.

From a consideration of the above description, it is seen that the invention provides a pneumatic hay stacker of a portable type which is readily adapted to be positively positioned on the ground surface and operated by the tractor used for moving it from place to place. The conveyor 26 and frame 10 are relatively assembled to provide for a ready unloading of hay thereon, while the blades 69 operate efficiently to both break up or separate any bunches of hay and to control the rate of hay delivery to the blower 54.

Although the invention has been described with respect to a preferred embodiment thereof, it is to be understood that it is not to be so limited since changes can be made therein which are within the full intended scope of this invention as defined by the appended claims.

I claim:

1. A pneumatic stacker comprising a portable frame having a tractor hitch attachment at one end and an upright blower casing at its other end, an inlet for said casing in the inner side thereof, a blower rotatably supported within said casing, hay conveyor means extended lengthwise of said frame having a horizontal portion and an upwardly and outwardly inclined portion terminating at said casing inlet, with said horizontal portion being arranged within the vertical confines of said frame, and ground wheels detachably mounted at said other end of the frame such that on disconnection of said hitch attachment and removal of said wheels, the bottom side of the frame rests directly on the ground surface, with said frame being of a vertical height such that in a ground supported position a vehicle can be driven transversely thereof over the horizontal portion of said conveyor means.

2. A pneumatic hay stacker comprising a portable elongated frame having a tractor hitch attachment at one end, an upright blower casing at the opposite end of said frame having an inlet facing the one end of said frame, a blower rotatably supported within said casing, ground wheels demountably carried at said opposite frame end such that on their removal and the disconnection of the hitch attachment from a tractor the bottom side of the frame rests on the ground surface, hay conveying means extended lengthwise of said frame below the inlet of the blower and at a vertical height such that in ground supported position a vehicle can be driven transversely thereover, together with an inclined ramp extending upwardly from said conveying means to said inlet, with the conveying means extending up said ramp for delivering hay to said inlet.

3. A pneumatic stacker comprising a portable frame having an upright blower casing at its outer end, an inlet for said casing in the inner side thereof, a blower rotatably supported within said casing, hay conveyor means extending lengthwise of said frame having a horizontal portion and an upwardly and outwardly inclined portion terminating at said casing inlet, with said horizontal portion being arranged within the vertical confines of said frame whereby the bottom side of the frame rests directly on the ground surface, with said frame being of a vertical height such that in a ground supported position a vehicle can be driven transversely thereof over the horizontal portion of said conveyor means.

4. A pneumatic stacker comprising a portable frame having a tractor hitch attachment at one end and blower casing at its other end, an inlet for said casing in the inner side thereof, a blower rotatably supported within said casing, hay conveyor means extending lengthwise of said frame and terminating at said casing inlet, said conveyor being arranged within the vertical confines of said frame, and ground wheels detachably mounted at said other end of the frame such that on disconnection of said hitch attachment and removal of said wheels, the bottom side of the frame rests directly on the ground surface, with said frame being of a vertical height such that in a ground supported position a vehicle can be driven transversely thereof over the horizontal portion of said conveyor means.

5. A pneumatic stacker comprising a portable frame having a blower casing at its outer end, an inlet for said casing in the inner side thereof, a blower rotatably supported within said casing, hay conveyor means extending lengthwise of said frame and terminating at said casing inlet, said conveyor being arranged within the vertical confines of said frame whereby the bottom side of the frame rests directly on the ground surface, with said frame being of a vertical height such that in a ground supported position a vehicle can be driven transversely thereof over the horizontal portion of said conveyor means.

6. In a pneumatic stacker, a blower comprising a casing including an inlet and an outlet, with a centrifugal fan within said casing consisting of a flat disc rotatably mounted in a position coaxial with the inlet of the casing; said disc having a centrally disposed dasher in the form of a relatively flat paddle extending through and projecting from the inlet opening of the housing; with a plurality of relatively small air fins carried by said disc near its outer periphery and substantially spaced away from the dasher to provide an unobstructed open passage between the dasher and the fins.

7. In a pneumatic stacker, a blower comprising a casing including an inlet and an outlet, a centrally disposed rotary dasher in the form of a relatively flat paddle extending through and projecting from the inlet opening of the housing, and a rotary fan within the casing; said fan having a plurality of small air fins substantially spaced away from the dasher to provide an unobstructed open passage between the dasher and the fins.

8. In a pneumatic hay stacker, in combination, a blower having a casing with an inlet and outlet therein, an inclined ramp to the inlet and a horizontal frame below the inlet and at the opposite end of said inclined ramp, said horizontal frame comprising a pair of longitudinal beams having inwardly disposed flanges adapted to bear upon a supporting surface along the entire length of the beams, a floor extending between the beams and spaced substantially above said flanges to define conveyor chain channels between the flanges and the floor, and a conveyor comprising a pair of endless conveyor chains each having an operating span above the floor and a return span extending through one of the channels with a plurality of conveyor flights extending between said chains at spaced intervals along their length.

9. In a pneumatic hay stacker, in combination, a blower having a casing with an inlet and outlet therein, and a horizontal frame below the inlet; said horizontal frame comprising a pair of longitudinal beams adapted to bear upon a supporting surface along the entire length of the beams, a floor extending between the beams and spaced substantially above said flanges to space the floor above the supporting surfaces, and a conveyor having an operating span above the floor and a return span extending below the floor and between the beams, with a plurality of conveyor flights extending at spaced intervals along the length of the conveyor.

10. A pneumatic hay stacker comprising a portable, elongated frame consisting of a pair of longitudinal beams adapted to bear upon a supporting surface along their entire length, a blower comprising a centrifugal fan housing extending between said beams at one end thereof, said blower including a rotary fan rotatable on an axis between and above said beams, an inclined ramp extending upwardly from a point intermediate the length of said frame beams to the blower intake, and a conveyor extending along said inclined ramp and along the portion of the longitudinal beams remote from the blower housing, the return span of said conveyor being within the vertical height of the beams so that a vehicle can be driven over the horizontal portion of said conveyor.

GLEN W. STODDARD.

REFERENCES CITED

The following references are of record in the file of this patent:

UNITED STATES PATENTS

| Number | Name | Date |
| --- | --- | --- |
| 1,490,404 | Ronning et al. | Apr. 15, 1924 |
| 2,269,520 | Crites | Jan. 13, 1942 |
| 2,340,983 | Pfeiffer et al. | Feb. 8, 1944 |
| 2,410,501 | Huddle | Nov. 5, 1946 |